(12) United States Patent
Park et al.

(10) Patent No.: US 9,870,518 B2
(45) Date of Patent: Jan. 16, 2018

(54) DATA PROCESSING SYSTEM

(71) Applicant: Hanwha Techwin Co., Ltd., Changwon-si (KR)

(72) Inventors: Dong Jun Park, Changwon-si (KR); Hak Chul Shin, Changwon-si (KR); Yeon Geol Ryu, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/024,188

(22) PCT Filed: Mar. 25, 2014

(86) PCT No.: PCT/KR2014/002483
§ 371 (c)(1),
(2) Date: Mar. 24, 2016

(87) PCT Pub. No.: WO2015/093687
PCT Pub. Date: Jun. 25, 2015

(65) Prior Publication Data
US 2016/0232429 A1 Aug. 11, 2016

(30) Foreign Application Priority Data

Dec. 16, 2013 (KR) .................. 10-2013-0156647

(51) Int. Cl.
*G06K 9/46* (2006.01)
*G06K 9/62* (2006.01)
(Continued)

(52) U.S. Cl.
CPC ..... *G06K 9/6232* (2013.01); *G06F 17/30247* (2013.01); *G06F 17/30265* (2013.01);
(Continued)

(58) Field of Classification Search
CPC ......... G06F 17/30864; G06F 17/30256; G06F 17/30274; G06F 19/3406; G06F 17/30;
(Continued)

(56) References Cited

U.S. PATENT DOCUMENTS 4,253,154 A * 2/1981 Russ .................. G01N 23/2251
250/311
5,812,389 A * 9/1998 Katayama ............... B21B 37/00
700/2
(Continued)

FOREIGN PATENT DOCUMENTS

JP 2001-006057 A 1/2001
JP 2005-094587 A 4/2005
(Continued)

OTHER PUBLICATIONS

International Search Report for PCT/KR2014/002483 dated Sep. 16, 2014 [PCT/ISA/210].
(Continued)

*Primary Examiner* — Aklilu Woldemariam
(74) *Attorney, Agent, or Firm* — Sughrue Mion, PLLC (57) ABSTRACT

Provided is a data processing system providing various user interfaces to users by analyzing and processing data collected via various routes, by using a parallel and distributive manner based on the assumption that generation, analysis, storage, and consumption of data is performed at various locations.

18 Claims, 8 Drawing Sheets (51) Int. Cl.
*G06F 17/30* (2006.01)
*G06K 9/00* (2006.01)
(52) U.S. Cl.
CPC ........... *G06K 9/00771* (2013.01); *G06K 9/46* (2013.01); *G06K 9/6253* (2013.01)
(58) Field of Classification Search
CPC ......... G06F 17/30312; G06F 17/30817; G06F 11/1451; G06F 17/30082; G06F 17/30424; G06F 17/30265; G06F 17/3028; G06F 17/30268; G06F 17/3082; G06F 17/30876; G06F 17/30247; G06F 17/30244; G06F 17/30371; G06F 19/322; G06F 19/327; G06F 19/3418; G08B 13/19641; G08B 13/19656; G08B 13/1968; G08B 13/19682; G08B 13/19693; G08B 13/19695; G08B 13/19697; H04L 67/06; H04L 67/306; H04L 69/329; H04L 67/10; H04Q 2209/20; H04Q 2209/43; H04Q 2209/845; H04Q 9/00; G06T 2207/20104; G06T 7/12; G06T 2215/00; G06T 3/00; G06T 7/73; G06T 1/00; G02B 21/365; G06K 9/00; G06K 9/0063; G06K 9/32; G06K 9/6224; G06K 9/6255; G06K 9/00771; G06K 9/6253; G06K 9/626; G06K 9/629; G06K 9/6293; Y10S 707/99942; H04N 21/00; H04N 21/25866; H04N 2101/00; H04N 5/23219; H04N 7/181; H04N 7/18; H04N 21/23424; H04N 21/25875; H04N 21/2747; H04N 21/4143; H04N 21/4223; H04N 21/42684; G06N 5/04; G06N 7/005; G06N 99/005; G06Q 10/0633; G06Q 50/22
USPC ......... 382/190; 340/531, 506, 153; 707/741, 707/695, 705, 758, 802
See application file for complete search history.

(56) References Cited

U.S. PATENT DOCUMENTS

| | | | | |
|---|---|---|---|---|
| 6,864,779 B2* | 3/2005 | Stack | ...................... | H04L 29/06 340/12.53 |
| 7,555,148 B1* | 6/2009 | Steinberg | .......... | G06F 17/30247 340/5.53 |
| 7,882,143 B2* | 2/2011 | Smyros | ............ | G06F 17/30091 706/50 |
| 8,229,934 B2 | 7/2012 | Furusawa et al. | | |
| 8,527,506 B2* | 9/2013 | Franks | ............. | G06F 17/30017 707/722 |
| 8,583,631 B1* | 11/2013 | Ganapathi | ......... | G06F 17/30554 707/722 |
| 8,584,160 B1* | 11/2013 | Huang | ............... | G06K 9/00724 382/190 |
| 8,719,288 B2* | 5/2014 | Bronstein | ......... | G06F 17/30799 707/758 |
| 8,755,609 B2* | 6/2014 | Thakkar | .............. | G06F 17/3028 382/173 |
| 2005/0162268 A1* | 7/2005 | Grindstaff | ........ | G08B 13/19641 340/531 |
| 2006/0159367 A1* | 7/2006 | Zeineh | ................. | G02B 21/365 382/276 |
| 2007/0254922 A1* | 11/2007 | Hiraiwa | .............. | G06F 11/2058 514/338 |
| 2008/0222142 A1* | 9/2008 | O'Donnell | ........ | G06F 17/30867 |
| 2010/0049740 A1* | 2/2010 | Iwase | ..................... | G06F 19/321 705/7.27 |
| 2014/0161354 A1* | 6/2014 | Curcio | ................ | G06K 9/00718 382/190 |
| 2014/0181039 A1* | 6/2014 | Harrison | ........... | G06F 17/30091 707/652 |
| 2014/0351233 A1* | 11/2014 | Crupi | ................. | G06F 17/30516 707/706 |
| 2014/0365505 A1* | 12/2014 | Clark | ................ | G06F 17/30864 707/748 |
| 2016/0065637 A1* | 3/2016 | O'Malley | ............ | H04L 67/306 709/231 |
| 2016/0217387 A1* | 7/2016 | Okanohara | .......... | G06N 99/005 |

FOREIGN PATENT DOCUMENTS

| | | |
|---|---|---|
| KR | 10-2009-0002604 A | 1/2009 |
| KR | 10-2010-0009937 A | 1/2010 |
| KR | 10-2012-0003834 A | 1/2012 |
| KR | 10-2013-0059093 A | 6/2013 |

OTHER PUBLICATIONS

Written Opinion for PCT/KR2014/002483 dated Sep. 16, 2014 [PCT/ISA/237].

* cited by examiner

```
<Analytics>
  <Frame Number="239">
    <Object Objectid="1001">
      <Location>
        <BoundingBox left="300" top="200" right="340" bottom="260"/>
      </Location>
    </Object>
  </Frame>
</Analytics>
```

<METADATA>

FIG. 4B

```
<Analytics>
  <Frame Number="239">
    <Object Objectid="1001">
      <Location>
        <BoundingBox left="300" top="200" right="340' bottom='260'/>
      </Location>
      <Class>
       <Type>Car</Type>
       <Confidence>1.0</Confidence>
      <Class>
    </Object>
  <Frame>
</Analytics>
```

<METADATA>

FIG. 4C

```
<Analytics>
  <Frame Number="239">
    <Object Objectid="1001">
      <Location>
        <BoundingBox left="300" top="220" right="340' bottom='260'/>
      </Location>
      <Class>
        <Type>Car</Type>
        <Confidence>1.0</Confidence>
      </Class>
      <Color>
        <Value R="0" G="0" B="0"/>
        <Class>White<Class>
      </Color>
    </Object>
  <Frame>
</Analytics>
```

<METADATA>

DATA PROCESSING SYSTEM

CROSS-REFERENCE TO RELATED APPLICATION

This is a National Stage Entry of International Application No. PCT/KR2014/002483 filed Mar. 25, 2014, claiming priority based on Korean Patent Application No. 10-2013-0156647 filed Dec. 16, 2013, the contents of all of which are incorporated herein by reference in their entirety.

TECHNICAL FIELD

The inventive concept relates to a data processing system for providing a user with various user interfaces by analyzing and processing data collected via various routes, in a parallel and distributed manner.

BACKGROUND ART

As network performance is improving, analog cameras are replaced by digital cameras. Digital cameras are easier to install or manage than analog cameras, and are also compatible with various apparatuses. Thus, the market share of digital cameras is rapidly increasing. Such a change in the market has a great influence also on surveillance systems, and also a central monitoring server (CMS) which manages multiple cameras and receives images using only network equipment and without using an additional device converting an analog signal into a digital signal for image analysis through a computer.

Due to development of networks, data analysis and management of not only image data is required but analysis and management of a vast amount of data is increasingly required as various additional sensors are adopted. Various sensor data enables diverse and abundant analysis which allows providing a user scenario. For example, when temperature data and electrical sensor data are used with image data, a scenario of sensing a temperature increase of a particular region and abnormality of an electrical sensor to sense a risk of fire may be possible.

Convergence of various data as above is very comprehensive, and various scenarios may be available, and is thus an attractive management system. However, a technical entry barrier therefor is high and it is difficult to implement the system. For example, the increase in a data size and the necessity for analysis cause the difficulty. Parallel/distributed systems according to the conventional art are limited to input, storage and processing of data in respect of solving the problem. That is, the system is focused on reasons that input data is appropriate for parallel/distributed processing, and how such processing is enabled, but a design that is based on usability for users is not suggested.

DETAILED DESCRIPTION OF THE INVENTIVE CONCEPT

Technical Problem

The inventive concept provides a data processing system for providing a user with various user interfaces by analyzing and processing data collected via various routes, in a parallel and distributed manner based on the assumption that generation, analysis, storage, and consumption of data are performed at various locations.

Technical Solution

According to an aspect of the inventive concept, there is provided a data processing system including: a data generation means configured to collect first data obtained by analyzing image and audio data obtained using at least one network camera, using first metadata from among predefined metadata, second data sensed using at least one sensor, and third data provided from the outside; a data analysis means configured to store second analysis result data obtained by analyzing first through third data received via a network, using second metadata from among the predefined metadata; a data storage means configured to store the first through third data and the second analysis result data via the network and store third analysis result data obtained by analyzing the first through third data and the second analysis result data by using third metadata from among the predefined metadata; and a data consumption means included in the data analysis means and the data storage means, wherein the data consumption means provides, according to a request of the user terminal, the first through third data or the second or third analysis result data in the form of a user interface.

The network camera may include: a generator configured to generate image data and audio data; and an analyzer configured to generate, as the first data, first analysis result data obtained by analyzing the image data and the audio data by using first metadata from among the predefined metadata.

The analysis means may include: an analysis unit configured to generate second analysis result data obtained by analyzing the first through third data by using second metadata from among the predefined metadata; and a consumption unit configured to provide, according to a request of the user terminal, the second analysis result data in the form of the user interface.

The analyzing means may include: an analyzer configured to generate second analysis result data obtained by analyzing the first through third data by using second metadata from among the predefined metadata; and a second analyzer configured to store the second analysis result data.

The analyzing means may include: an analyzer configured to generate second analysis result data obtained by analyzing the first through third data by using second metadata from among the predefined metadata; a storage configured to store the second analysis result data; and a consumption unit configured to provide, according to a request of the user terminal, the second analysis result data stored in the storage in the form of the user interface.

The analyzing means may include: an analyzer configured to generate second analysis result data obtained by analyzing the first through third data by using second metadata from among the predefined metadata; and at least one of a storage configured to store the second analysis result data, and a consumption unit configured to provide, according to a request of the user terminal, the second analysis result data stored in the storage in the form of the user interface.

The storage means may include a first storage including a storage storing the first through third data and the second analysis result data.

The storage means may include a second storage including: a storage configured to store the first through third data and the second analysis result data; and a consumption unit configured to provide the first through third data and the second analysis result data according to a request of the user terminal, in the form of the user interface.

The storage means may include a third storage including: a storage configured to store the first through third data and the second analysis result data; and an analyzer configured to generate third analysis result data obtained by analyzing the first through third data and the second analysis result by using third metadata from among the predefined metadata.

The storage means may include a fourth storage including: a storage configured to store the first through third data and the second analysis result data; an analyzer configured to generate third analysis result data obtained by analyzing the first through third data and the second analysis result data by using third metadata from among the predefined metadata; and a consumption unit configured to provide, according to a request of the user terminal, the third analysis result data in the form of the user interface.

The storage means may include a storage configured to store the first through third data and the second analysis result data; and at least one of an analyzer configured to generate third analysis result data obtained by analyzing the first through third data and the second analysis result data by using third metadata from among the predefined metadata, and a consumption unit configured to provide, according to a request of the user terminal, the third analysis result data in the form of the user interface.

The analyzer may include: a distribution module configured to distribute the data; and at least one of a simultaneous analyzer including a plurality of different analysis modules from one another, wherein each of the analysis modules receives the data distributed by the distribution module and performs analysis by using metadata predefined in each of the distribution modules, and a sequential analyzer including a plurality of different analysis modules from one another, wherein an analysis module that has received data distributed by the distribution module performs analysis by using predefined metadata, and a next analysis module receives a result of the analysis and performs analysis by using predefined metadata and outputs a result of the analysis to another next analysis module.

The analyzer may include: a distribution module configured to distribute the data; and at least one of a simultaneous analyzer including a plurality of different analysis modules from one another, wherein each of the analysis modules receives the data distributed by the distribution module and performs analysis by using metadata predefined in each of the distribution modules, and a sequential analyzer including a plurality of different analysis modules from one another, wherein an analysis module that has received data distributed by the distribution module performs analysis by using predefined metadata, and a next analysis module receives a result of the analysis and performs analysis by using predefined metadata and outputs a result of the analysis to another next analysis module.

The distribution module may periodically communicate with the analysis module to detect a state of the analysis module, and backs up data to be distributed when the analysis module operates abnormally.

The distribution module may periodically communicate with the analysis module to detect a state of the analysis module, and back up data to be distributed when the analysis module operates abnormally.

The storage means may further include an indexing unit processing stored data and analysis result by structuralizing and arranging the data and the analysis result so that the data and the analysis result are easy to search.

The consumption means may include a plurality of user interface models, and provide different user interfaces based on the first through third data or the second or third analysis result.

The user terminal may download an application via which the data processing system is accessible.

The user terminal may set a search condition including predetermined time information to receive the user interface from the consumption means.

The search condition may be transmitted to the analysis means or the storage means via the network, or may be directly transmitted to the analysis means or the storage means.

Advantageous Effects

As described above, according to the inventive concept, based on the assumption that generation, analysis, storage, and consumption of data are performed at various locations, various user interfaces may be provided to a user by analyzing and processing data collected via various routes, in a parallel and distributed manner.

BEST MODE

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the inventive concept could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The embodiments of the inventive concept will be described below in more detail with reference to the accompanying drawings. Those components that are the same or are in correspondence are rendered the same reference numeral regardless of the figure number, and redundant explanations are omitted.

Figure 1:
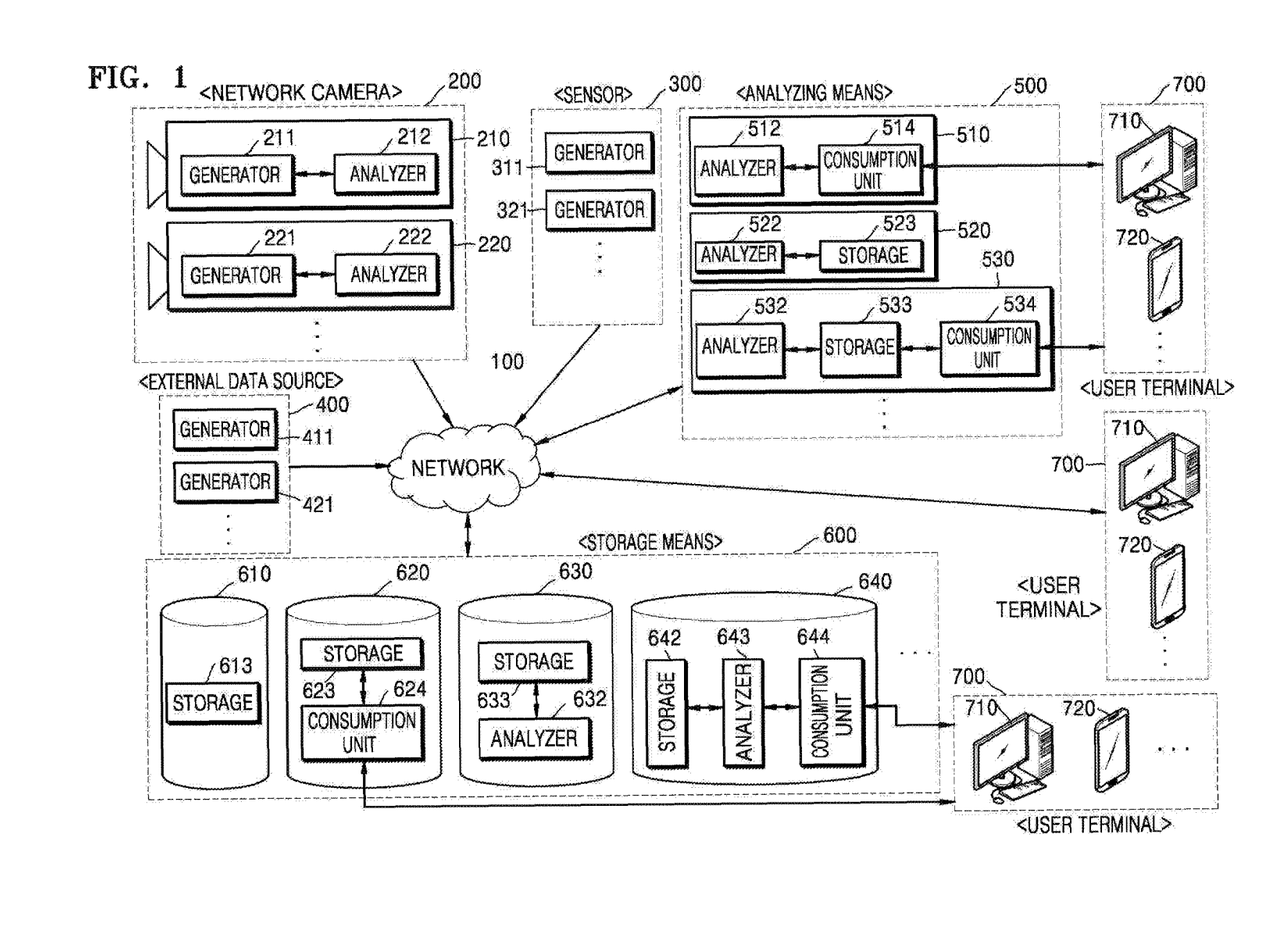
FIG. 1 illustrates a structure of a data processing system according to an embodiment of the inventive concept.

FIG. 1 illustrates a structure of a data processing system according to an embodiment of the inventive concept.

Referring to FIG. 1, the data processing system 10 may include a network 100, a network camera 200, a sensor 300, an external data source 400, an analyzing means 500, a storage means 600, and a user terminal 700. The data processing system 10 operates based on the assumption that generation, analysis, storage, and consumption of data are performed at various locations. Generation of data is performed using the network camera 200, the sensor 300, and the external data source 400. Analysis of data is performed using the network camera 200, the analyzing means 500, and the storage means 600. Storage of data and consumption of data, which refers to providing various user interfaces to the user terminal 700, are performed using the analyzing means 500 and the storage means 600.

At least one network camera 200 performing data generation may be installed in a certain area, and captured images (moving picture (or video) and still image) and recorded audio data may be converted into digital image and audio data and transmitted to the analyzing means 500 and/or the storage means 600 via the network 100. The network camera 200 may be a speed dome camera located at a fixed location of a particular place. In addition, the network camera 200 may be a single fixed-type camera which includes a fixed lens and whose image capturing range is fixed or may be a PTZ (pan-tilt-zoom) camera having a variable image capturing range. The PTZ camera may easily change various surveillance areas using a single camera via a panning operation, in which the camera rotates in a horizontal direction, a tilt operation, in which the camera is rotated in a vertical direction, and a zoom-in or zoom-out operation.

Here, at least one network camera 200 may be installed. According to the present embodiment, description will focus on a first network camera 210 and a second network camera 220 for convenience of description. The first and second network cameras 210 and 220 may respectively include generators 211 and 221 and analyzers 212 and 222. The generators 211 and 221 convert image and audio data obtained by capturing a particular area, into digital image and audio data. The analyzers 212 and 222 generate first data (first analysis result data) obtained by analyzing the digital image and audio data by using first metadata which is analyzable by the first and second network cameras 210 and 220 from among predefined metadata, and transmits the first data to the analyzing means 500 or/and the storage means 600 via the network 100.

The sensor 300 performing data generation generates sensor data obtained from various mechanical sensors, which, for example, measure a temperature, an electricity usage amount, or radioactivity, and transmits the sensor data to the analyzing means 500 or/and the storage means 600 via the network 100. Here, at least one sensor 300 may be installed, and in the present embodiment, description will here focus on two sensors for convenience of description. The sensor 300 may include generators 311 and 321 generating second data by using the sensor data.

The external data source 400 performing data generation collects, from the outside, standardized data or non-standardized data that is written by the various sensors 300 and persons, such as crime records, emergency telephone call records, entrance and exit records, or credit card use records, and transmits the data to the analyzing means 500 or/and the storage means 600 via the network 100. In addition, the external data source 400 collects images and audio data obtained using another network camera, from the outside, and transmits the data to the analyzing means 500 or/and the storage means 600 via the network 100. Here, the external data source 400 may collect various types of external data, and may include generators 411 and 421 that collect third data by using various external data, for convenience of description.

The analyzing means 500 performing data analysis, storage, and consumption generates and stores second analysis result data obtained by analyzing first through third data received via the network 100, by using second metadata from among predefined metadata, and provides, according to a request of the user terminal 700, the second analysis result data to the user terminal 700 in the form of a user interface. In addition, the second analysis result data generated using the analyzing means 500 may be stored in the storage means 600 via the network 100.

The analyzing means 500 may include at least one of a first analyzer 510, a second analyzer 520, and a third analyzer 530.

The first analyzer 510 may include an analyzer 512 and a consumption unit 514. The analyzer 512 generates second analysis result data obtained by analyzing first through third data by using second metadata from among predefined metadata. Also, the second analysis result data generated using the analyzer 512 may be stored in the storage means 600 via the network 100. The consumption unit 514 provides, according to a request of the user terminal 700, the second analysis result data to the user terminal 700 in the form of a user interface.

The second analyzer 520 may include an analyzer 522 and a storage 523. The analyzer 522 generates second analysis result data obtained by analyzing first through third data by using second metadata from among predefined metadata. The analyzer 522 may generate another second analysis result data by analyzing an analysis result of the analyzer 512 included in the first analyzer 510 by using second metadata from among predefined metadata. The storage 523 stores second analysis result data. The second analysis result data generated using the analyzer 522 may be stored in the storage means 600 via the network 100.

The third analyzer 530 may include an analyzer 532, a storage 533, and a consumption unit 534. The analyzer 532 generates second analysis result data obtained by analyzing first through third data by using second metadata from among predefined metadata. The analyzer 522 may generate another second analysis result data by analyzing an analysis result of the analyzer 512 included in the first analyzer 510 or/and an analysis result of the analyzer 522 included in the second analyzer 520 by using second metadata from among predefined metadata. The storage 533 stores the second analysis result data. The second analysis result data generated using the analyzer 532 may be stored in the storage means 600 via the network 100. The consumption unit 534 provides, according to a request of the user terminal 700, the second analysis result data to the user terminal 700 in the form of a user interface.

The storage means 600 performing data analysis, storage, and consumption stores the first through third data and the second analysis result received via the network 100, or provides, according to a request of the user terminal 700, the first through third data and the second analysis result to the user terminal 700 in the form of a user interface. Also, the storage means 600 generates and stores third analysis result data obtained by analyzing the first through third data and the second analysis result by using third metadata from among predefined metadata, and provides, according to a request of the user terminal 700, the third analysis result data to the user terminal 700 in the form of a user interface.

The storage means 600 may include at least one of a first storage 610, a second storage 620, a third storage 630, and a fourth storage 640.

The first storage 610 may include a storage 613 storing the first through third data and the second analysis result data.

The second storage 620 may include a storage 623 and a consumption unit 624. The storage 623 stores the first through third data and the second analysis result data. The consumption unit 624 provides, according to a request of the user terminal 700, the first through third data and the second analysis result data to the user terminal 700 in the form of a user interface.

The third storage 630 may include an analyzer 632 and a storage 633. The analyzer 632 generates third analysis result data obtained by analyzing first through third data and second analysis result data by using third metadata from among predefined metadata. The storage 633 stores third analysis result.

The fourth storage 640 may include an analyzer 642, a storage 643, and a consumption unit 644. The analyzer 642 generates third analysis result data obtained by analyzing first through third data and second analysis result data by using third metadata from among predefined metadata. The analyzer 642 may analyze an analysis result of the analyzer 632 included in the third storage 630 by using third metadata from among predefined metadata to generate another third analysis result data. The storage 643 stores the third analysis result. The consumption unit 644 provides, according to a request of the user terminal 700, the third analysis result data to the user terminal 700 in the form of a user interface.

Although not illustrated in the storage means 600 here, an indexing unit that structuralize and arranges the first through third data, the second analysis result data, and the third analysis result data stored in the first storage 610 through the fourth storage 640 for easy search may be further included.

The user terminal 700 may receive the first through third data, the second analysis result data or the third analysis result data in the form of a user interface according to a request. To this end, the user terminal 700 may download and execute an application via which the data processing system 10 is accessed. The user terminal 700 sets a search condition to receive resultant data. When setting of a search condition is finished, the user terminal 700 may receive first through third data, second analysis result data, or third analysis result data from the analyzing means 500 or the storage means 600 in the form of a user interface via the network 100, or the user terminal 700 may be directly connected to the analyzing means 500 or the storage means 600 and receive first through third data, second analysis result data or third analysis result data in the form of a user interface. The user terminal 700 may be a mobile terminal such as a notebook computer, a handheld apparatus, a smart phone, a tablet, or a tablet PC, or a desktop computer, or a predetermined appropriate device that uses such device or is directly or indirectly connected to such device. For convenience of description, the user terminal 700 is limited to a desktop computer 710 and a smart phone 720 in the present embodiment, but is not limited thereto.

Figure 2A:
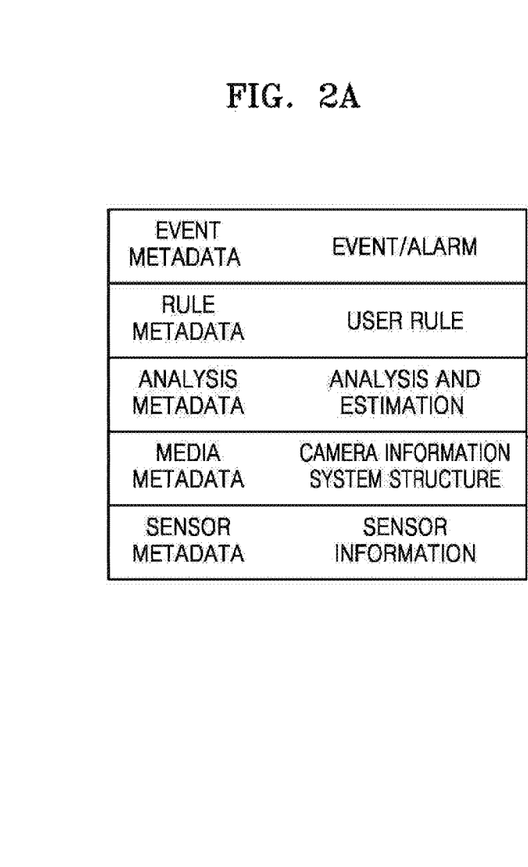
FIGS. 2A and 2B illustrates an example of metadata that is predefined in each device of FIG. 1.
Figure 2B:
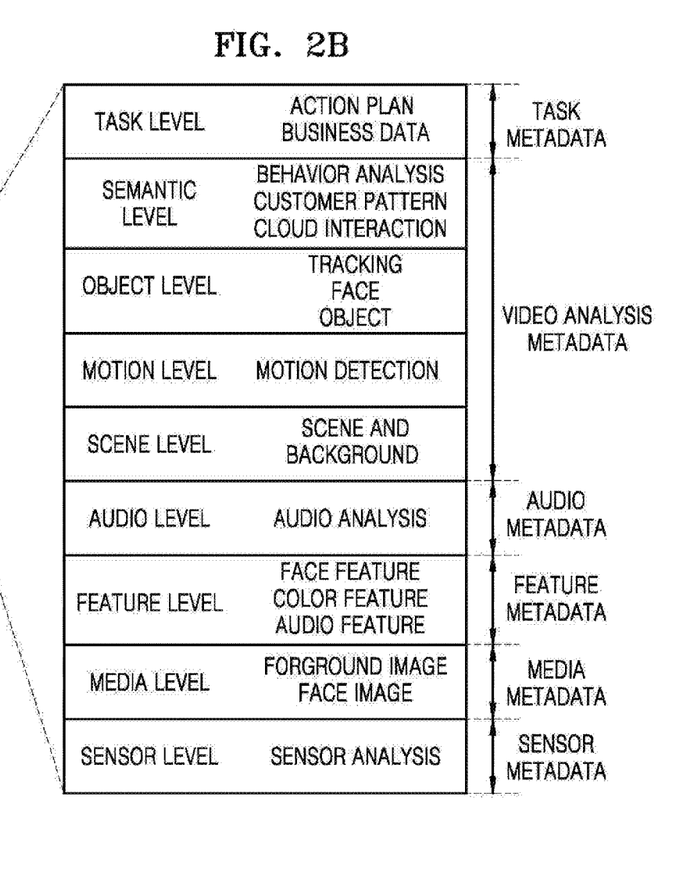

FIG. 2 illustrates an example of metadata that is predefined in each device of the data processing system 10. Referring to FIG. 2, FIG. 2A illustrates metadata predefined in the network camera 200, the analyzing means 500, and the storage means 600, and FIG. 2B illustrates analysis and estimation levels to be performed with respect to analysis metadata of FIG. 2A.

Referring to FIG. 2A, metadata predefined to perform data analysis may include event metadata, rule metadata, analysis metadata, media metadata, and sensor metadata, but is not limited thereto, and may be extended in various manners.

Event metadata is defined to perform an analysis of notifying occurrence of an event when data satisfies a condition for generating an event. The event may include an event set inside a system, for example, an event that a network error occurs or a new camera (not shown) is set. Also, an event for an input image may include appearance of an object in a set area of an image, a change of a screen color, or motion generated in a set area. In addition, an event for audio may include generation of abnormal audio (friction noise (skid) of car tires, glass breaking, alarm sounds, crashing sounds, etc.) and generation of audio of a threshold value or higher. For example, event metadata may include generating an alarm when a motion is generated in a predetermined area of an input image.

Rule metadata is defined to perform an analysis of notifying occurrence of an event set by a user when an event generation condition set by the user is satisfied. Here, the event generation condition set by the user may include, for example, when a certain image set by a user (for example, an unrecognizable face) is appeared on an image or when motion is generated in an area set by a user, or the like. Regarding audio, the condition may include a case when audio set by a user is generated (for example, man's shouting, woman's screaming, yelling of a child or the like). When an event generation condition set by a user is satisfied, the condition may include outputting an event generation notification as an alarm sound or warning light. For example, rule metadata may include generating an alarm sound when motion is occurred in an input image in an area set by a user.

Analysis metadata is defined to perform various analyses and estimations on data. FIG. 2B illustrates analysis and estimation levels to be performed with respect to analysis metadata. The analysis and estimation levels may include a sensor level in which an analysis result of data sensed by a sensor is output as a text, a media level in which an image analysis result is output as an image instead of a text (for example, a face recognition result regarding an image is output as a face image), a feature level in which an image analysis result is output as a feature of a text form (for example, a face feature, a color feature, an audio feature or the like), an audio level in which an audio analysis result is output in a text form, a scene level in which a scene analysis result is output in a text form (for example, an analyzed scene is output as a sky, a mountain, a building, or the like), a motion level in which whether motion is generated within an image or a predetermined area of an image is output in a text form, an object level in which an object analysis result is output in a text form within an image (for example, tracking, face or the like), a semantic level in which a meaning is given to analyzed data in a text form (for example, likes or dislikes with respect to a moving line generated as a result of data analysis are assigned), and a task level in which prediction is performed on analyzed data in a text form (for example, additional management personnel is disposed in a time period during which more people enter a predetermined place than other times), or the like.

Media metadata is defined to perform analysis of camera related information (for example, channel number, IP number, resolution, codec or the like) and system related information from data. Sensor metadata is defined to perform analysis of information about a sensor from data.

The network camera 200, the analyzing means 500, and the storage means 600 perform analysis of first through third data or second analysis result data input via the predefined metadata as illustrated in FIG. 2.

Here, analyzable metadata may be limited with respect to the network camera 200, the analyzing means 500, and the storage means 600 according to performance thereof. The network camera 200 may analyze data by using first metadata (for example, media level, feature level, motion level, and object level from among analysis metadata) from among preset metadata. The analyzing means 500 may analyze data by using second metadata (for example, sensor level, media level, feature level, audio level, scene level, motion level, and object level from among analysis metadata) that may include the first metadata from among the preset metadata. The storage means 600 may perform data analysis by using third metadata (for example, sensor level, media level, feature level, audio level, scene level, motion level, object level, semantic level, and task level from among analysis metadata) that may be the same as or include the second metadata from among the preset metadata.

Figure 3A:
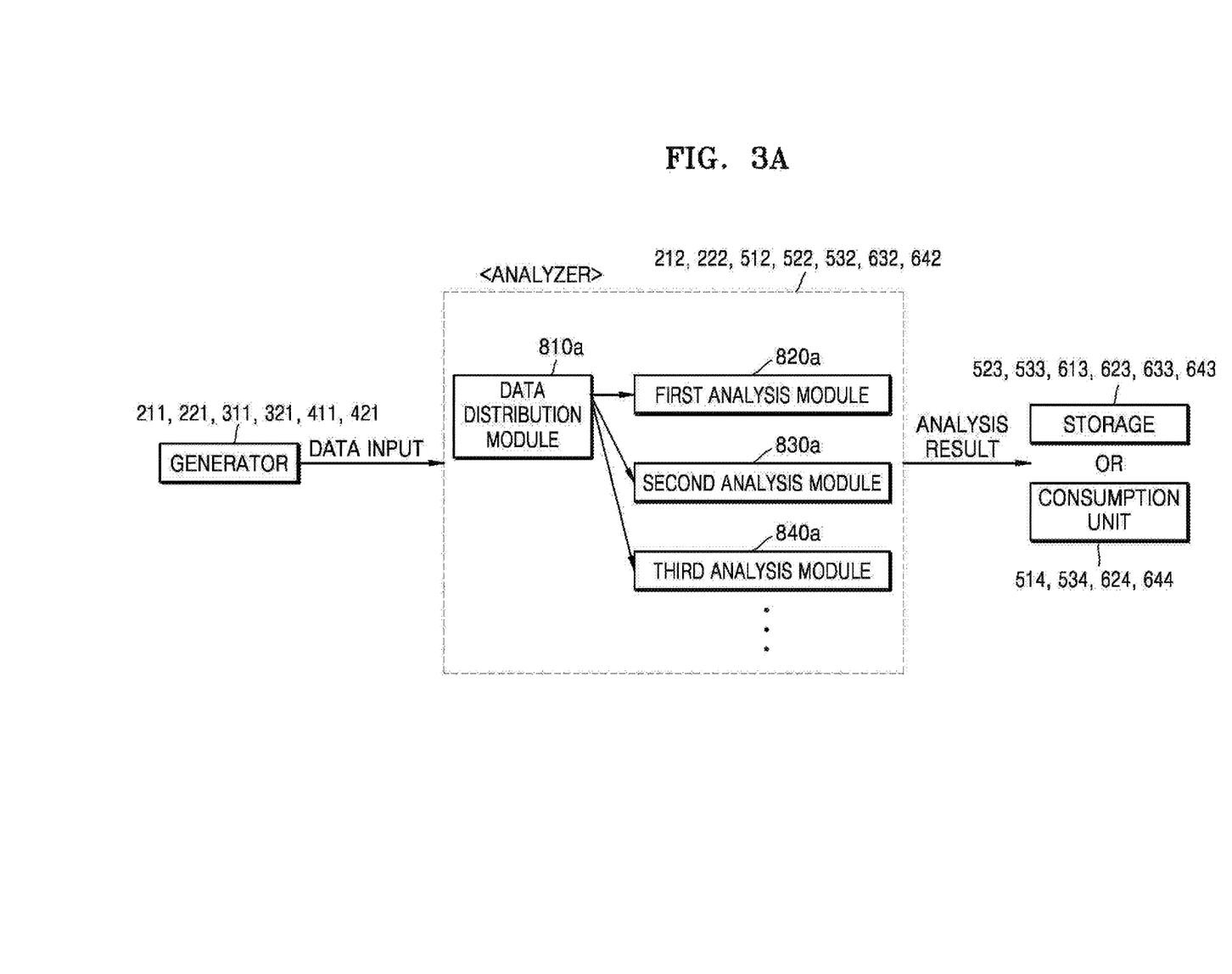
FIGS. 3A through 3C are detailed views of an analyzer of FIG. 1.
Figure 3B:
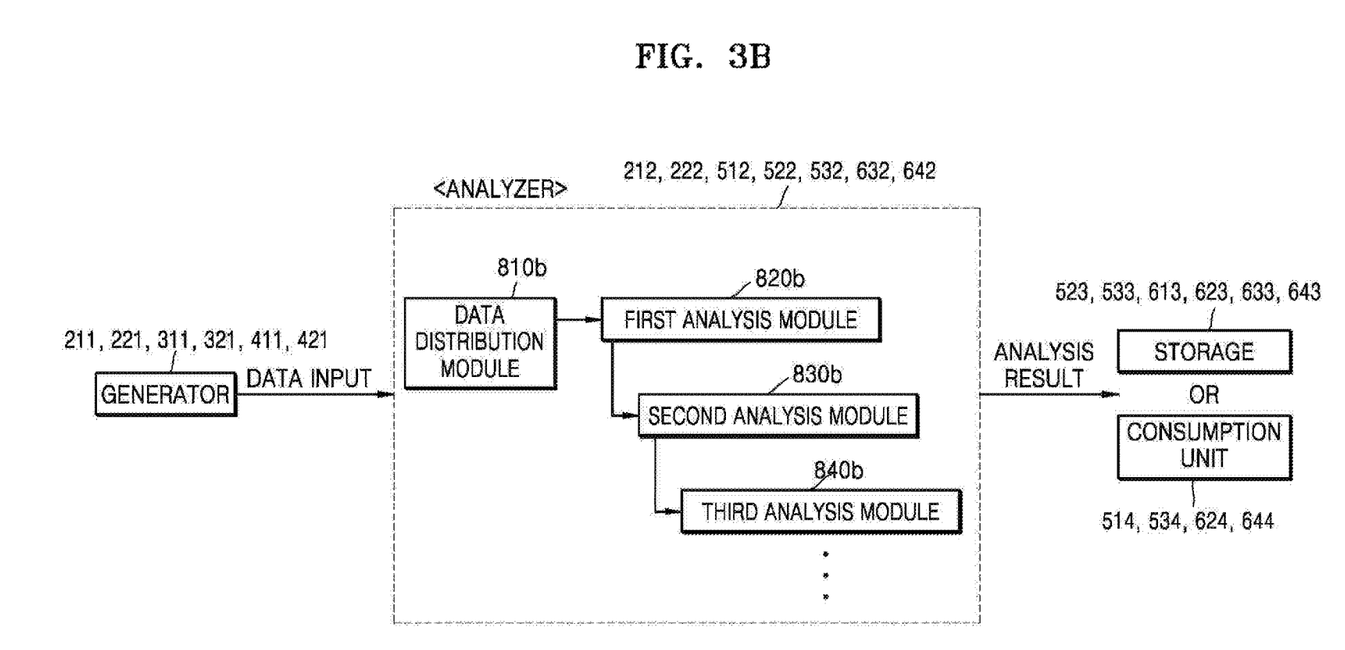
Figure 3C:
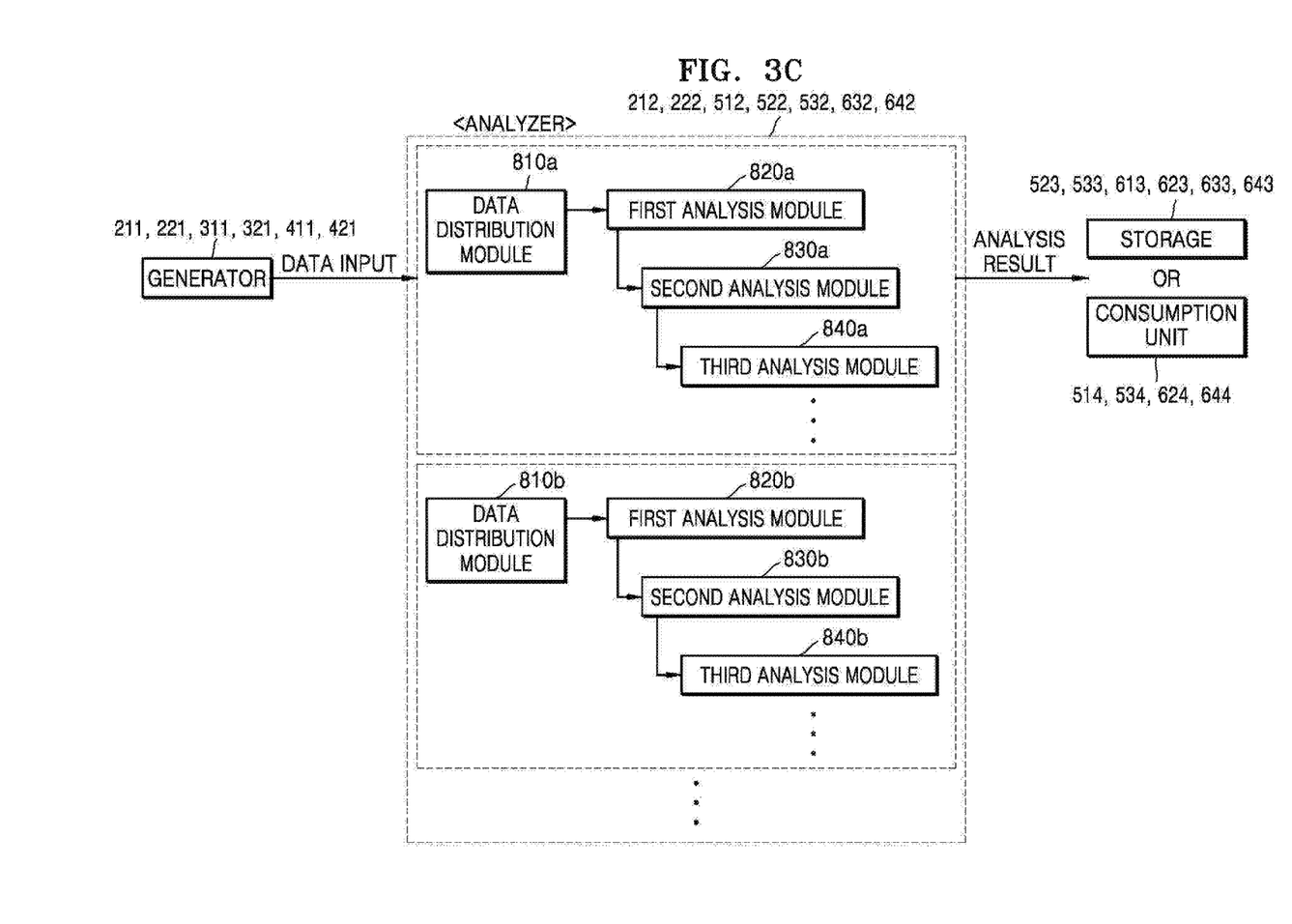

FIGS. 3A through 3C are detailed views of the analyzers 212, 222, 512, 522, 532, 632, and 642 of FIG. 1. Here, the analyzers 212 and 222 perform data analysis by using first metadata from among predefined metadata, and the analyzers 512, 522, and 532 perform data analysis by using second metadata from among predefined metadata, and the analyzers 632 and 642 perform data analysis by using third metadata from among predefined metadata.

FIG. 3A is a detailed view of the analyzers 212, 222, 512, 522, 532, 632, and 642 according to a first embodiment, and shows a simultaneous analysis model. Here, a simultaneous analysis model indicates that a plurality of different analysis modules respectively receive distributed data and perform analysis. For convenience of description, the number of analysis modules is limited to three, but the number is not limited thereto and may also be extended. The analyzers 212, 222, 512, 522, 532, 632, and 642 represented as a simultaneous analysis model may include a data distribution module 810a and first through third analysis modules 820a, 830a, and 840a. The data distribution module 810a distributes, to each of the first through third analysis modules 820a, 830a, and 840a, first through third data or second analysis result data that are collected using the generators 211, 221, 311, 321, 411, and 421 and transmitted via the network 100 or stored in the storage 523, 533, 613, 623, 633, and 642 and transmitted via the network 100. The data distribution module 810a periodically communicates with the first through third analysis modules 820a, 830a, and 840a to detect states of the first through third analysis modules 820a, 830a, and 840a, and transmits data to a analysis module. Here, the data distribution module 810a may back up data to be distributed to deal with a case when the first through third analysis modules 820a, 830a, and 840a operate abnormally, for example, if too much time is consumed to perform analysis or the first through third analysis modules 820a, 830a, and 840a are not able to perform an analysis function due to some reasons. The first analysis module 820a performs analysis of data distributed by the data distribution module 810a by using predefined metadata (first or second or third metadata). The second analysis module 830a performs analysis of data distributed by the data distribution module 810a by using predefined metadata (first or second or third metadata). The third analysis module 840a performs analysis of data distributed by the data distribution module 810a by using predefined metadata (first or second or third metadata). Each data analysis result of the first through third analysis modules 820a, 830a, and 840a is output to the storage 523, 533, 613, 623, 633, and 643 or the consumption units 514, 534, 624, and 644.

FIG. 3B is a detailed view of the analyzers 212, 222, 512, 522, 532, 632, and 642 according to a second embodiment, and shows a sequential analysis model. Here, a sequential analysis model refers that a plurality of different analysis modules performs an analysis of a present stage using an analysis result of a previous stage. For convenience of description, the number of analysis modules is limited to three, but the number is not limited thereto and may also be extended. The analyzers 212, 222, 512, 522, 532, 632, and 642 represented as a sequential analysis model may include a data distribution module 810b and first through third analysis modules 820b, 830b, and 840b. The data distribution module 810b distributes, to the first analysis module 820b, first through third data or second analysis result data that are collected using the generators 211, 221, 311, 321, 411, and 421 and transmitted via the network 100 or stored in the storages 523, 533, 613, 623, 633, and 642 and transmitted via the network 100. The first analysis module 820b performs analysis of data distributed by the data distribution module 810b by using predefined metadata (first or second or third metadata). The second analysis module 830b performs analysis of analysis result data of the first analysis module 820b by using predefined metadata (first or second or third metadata). The third analysis module 840b performs analysis of analysis result of the second analysis module 830b by using predefined metadata (first or second or third metadata). Analysis result data output from the third analysis module 840a is each output to the storage 523, 533, 613, 623, 633, and 643 or the consumption units 514, 534, 624, and 644.

FIG. 3C is a detailed view of the analyzers 212, 222, 512, 522, 532, 632, and 642 according to a third embodiment, and shows an example in which a simultaneous analysis model and a sequential analysis model are integrated into one analyzer. First through third data or second analysis result data that are collected using the generators 211, 221, 311, 321, 411, and 421 and transmitted via the network 100 or stored in the storages 523, 533, 613, 623, 633, and 642 and transmitted via the network 100 are input to a simultaneous analysis model and a sequential analysis model, and analysis result data output from the simultaneous analysis model and the sequential analysis model is each output to the storages 523, 533, 613, 623, 633, and 643 or the consumption units 514, 534, 624, and 644. The simultaneous analysis model is described in detail with reference to FIG. 3A, and the sequential analysis model is described with reference to FIG. 3B, and thus, detailed description regarding FIG. 3C will be omitted.

Analyzable metadata may be limited with respect to the network camera 200, the analyzing means 500, and the storage means 600 according to performance thereof, and thus, analysis results disclosed in FIGS. 3A through 3C are different from one another. Thus, user interfaces provided by the consumption units 514, 534, 624, and 644 to the user terminal 700 are also different from one another. The consumption units 514, 534, 624, and 644 possess various user interface models, and may select and configure different user interface models based on analysis results and provide the same to the user terminal 700. When a search is requested by the user terminal 700, the consumption units 514, 534, 624, and 644 may configure a user interface corresponding to an analysis result and provide the same to the user terminal 700.

Figure 4A:
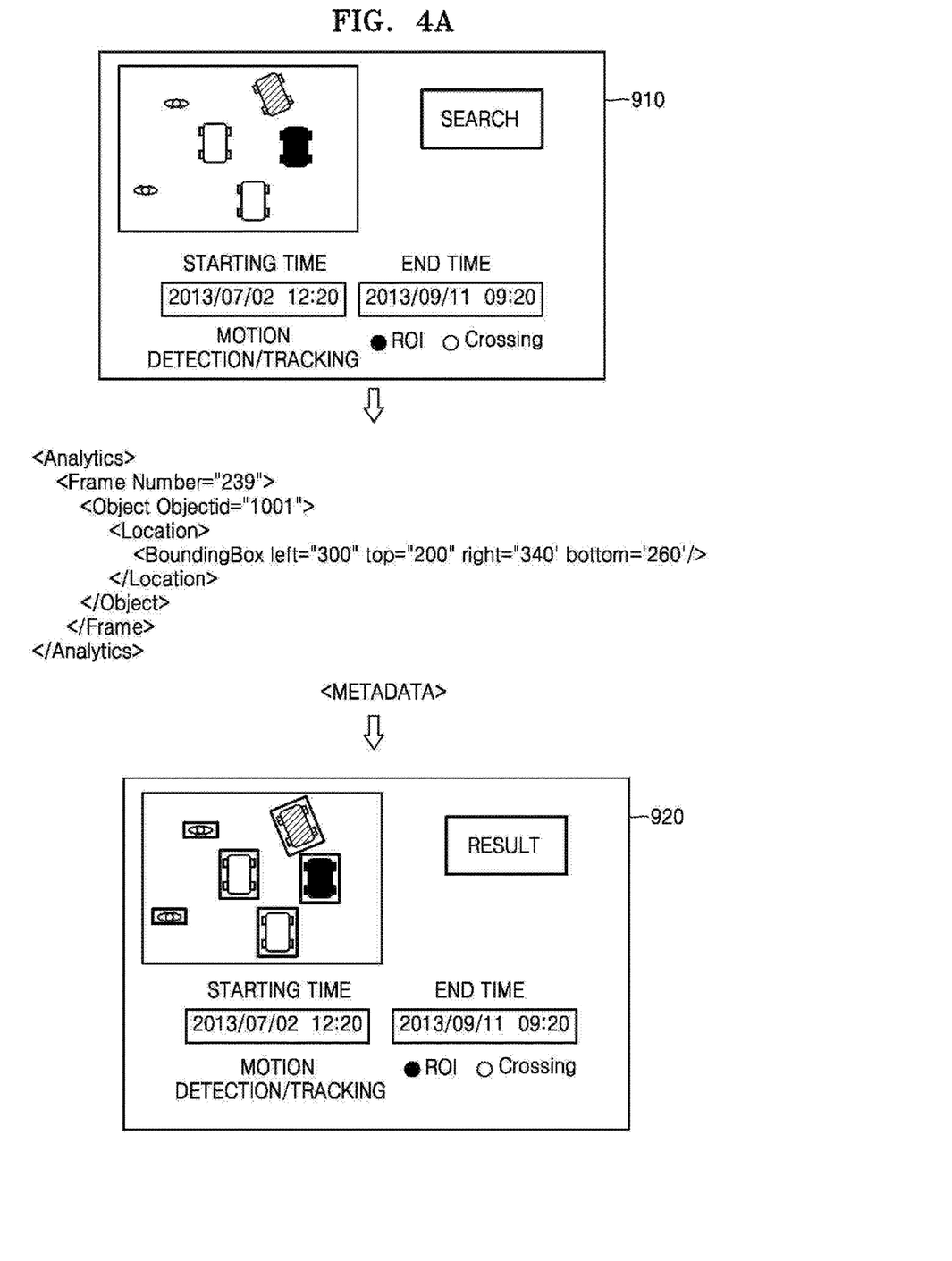
FIGS. 4A through 4C illustrate an example of a user interface via which a result of information required by a user terminal is received.
Figure 4B:
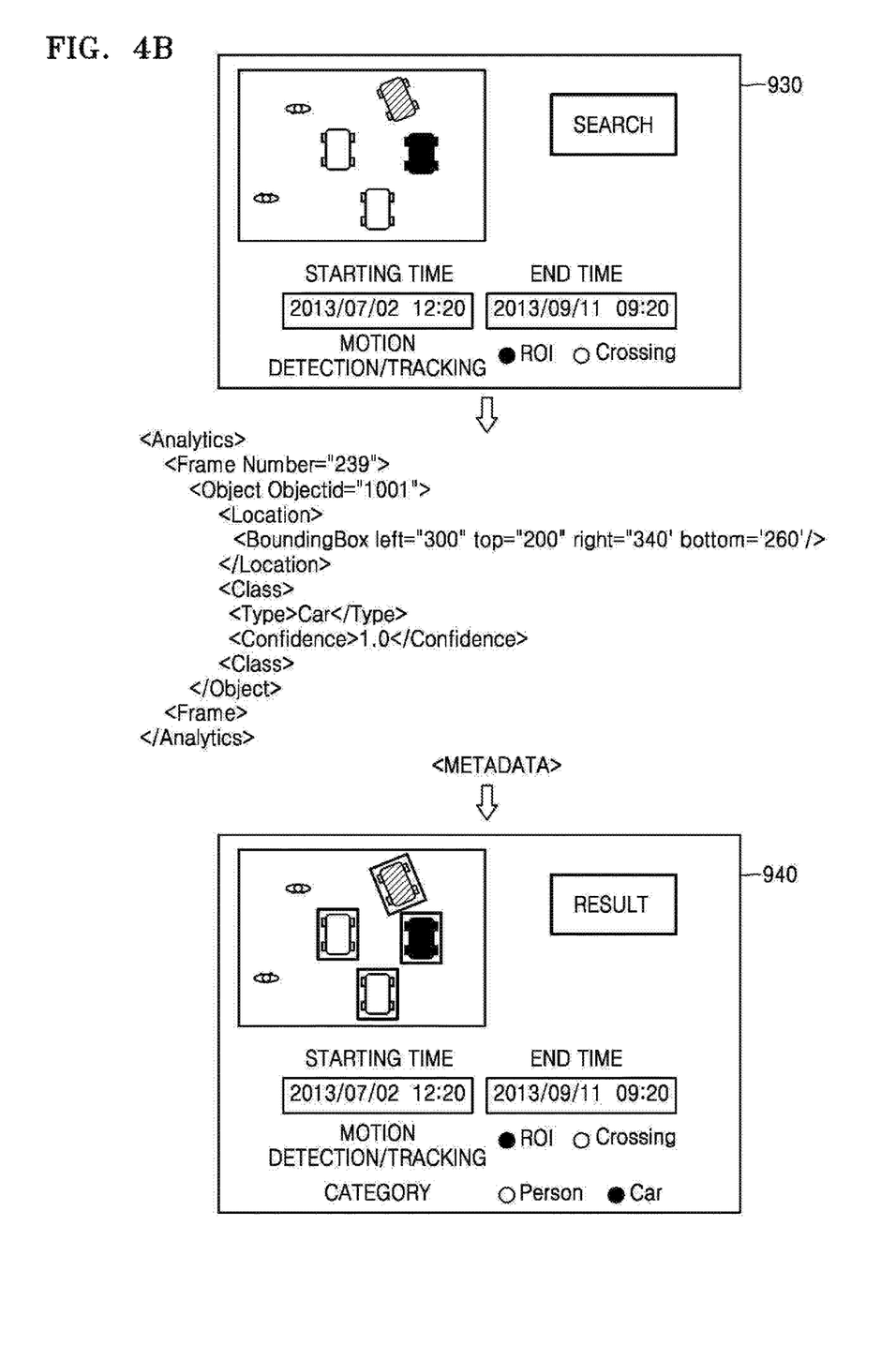
Figure 4C:
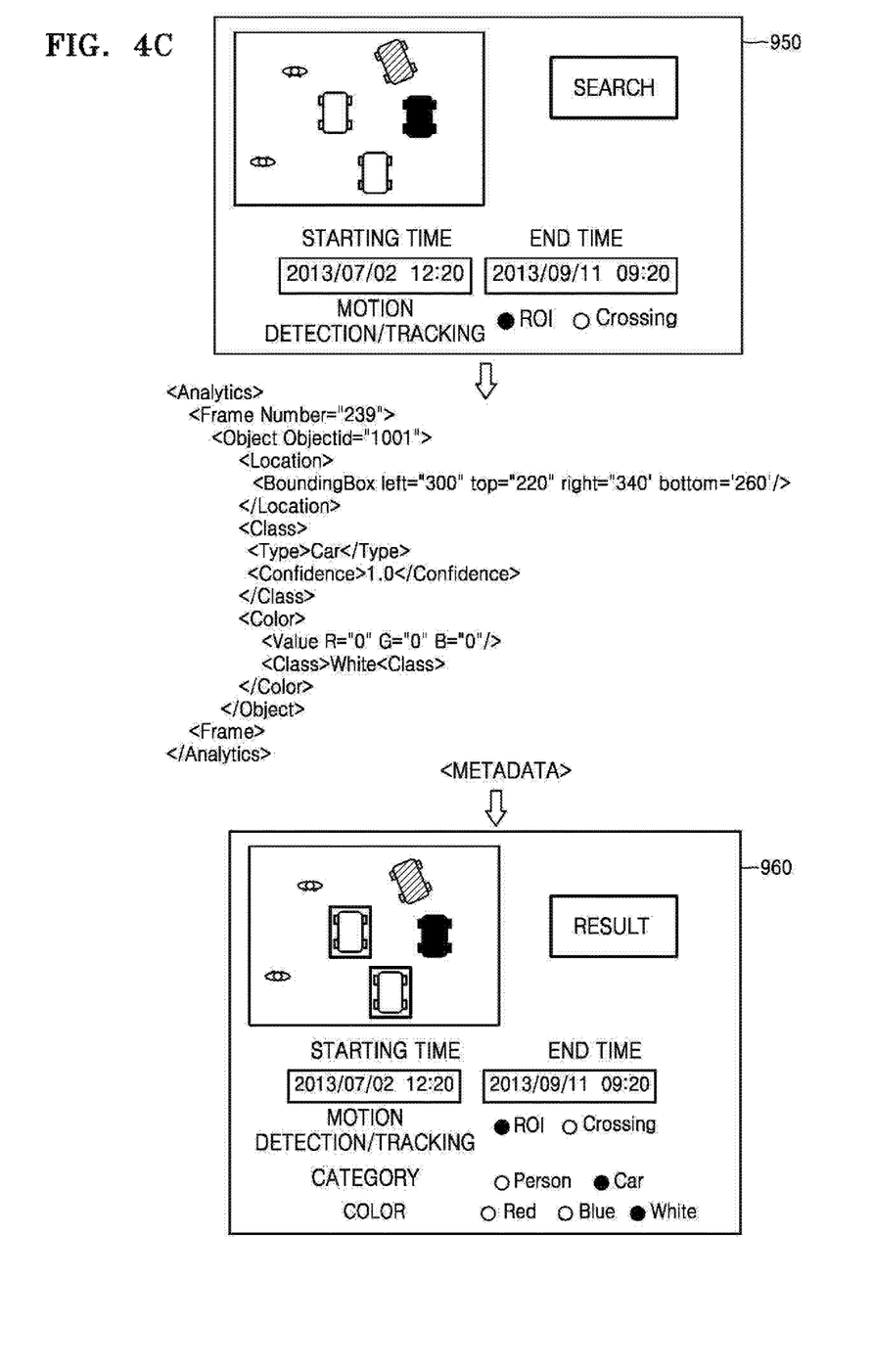

FIGS. 4A through 4C illustrate an example of a user interface via which a result about information requested by a user terminal is received.

FIG. 4A illustrates a user interface of the user terminal 700 according to a first embodiment. Referring to FIG. 4A, 910 indicates an example in which the user terminal 700 sets a search period and motion detection/tracking on a region of interest as a search condition to request predetermined information. When search is selected after setting of the search condition is completed, metadata corresponding to the search condition may be transmitted to the analyzing means 500 or the storage means 600 via the network 100 or may be transmitted directly to the analyzing means 500 or the storage means 600 without passing through the network 100. The analyzing means 500 or the storage means 600 transmits analysis result data or storage data corresponding to metadata of the search condition to the consumption unit (one of the consumption units 514, 534, 624, and 644). The consumption unit (one of the consumption units 514, 534, 624, and 644) receives analysis result data, and configures a user interface corresponding to analysis result data from among various user interface models and transmits the user interface to the user terminal 700. 920 is a view illustrating a user interface of a search result provided to the user terminal 700, and illustrates a motion detection/tracking result about a region of interest with respect to the search period set by a user.

FIG. 4B illustrates a user interface of the user terminal 700 according to a second embodiment. Referring to FIG. 4B, 930 indicates an example in which the user terminal 700 sets a search period and motion detection/tracking with respect to a region of interest and a category of a car as a search condition to request predetermined information. When search is selected after setting of the search condition is completed, metadata corresponding to the search condition may be transmitted to the analyzing means 500 or the storage means 600 via the network 100 or may be transmitted directly to the analyzing means 500 or the storage means 600 without passing through the network 100. The analyzing means 500 or the storage means 600 transmits analysis result data or storage data corresponding to metadata of the search condition to the consumption unit (one of the consumption units 514, 534, 624, and 644). The consumption unit (one of the consumption units 514, 534, 624, and 644) receives analysis result data, and configures a user interface corresponding to analysis result data from among various user interface models and transmits the user interface to the user terminal 700. 940 is a view illustrating a user interface of a search result provided to the user terminal 700, and illustrates a motion detection/tracking result about the car with respect to the search period set by a user.

FIG. 4C illustrates a user interface of the user terminal 700 according to a third embodiment. Referring to FIG. 4C, 950 indicates an example in which the user terminal 700 sets a search period and motion detection/tracking, with respect to a region of interest, a category of a car, and a white color as a search condition to request predetermined information. When search is selected after setting of the search condition is completed, metadata corresponding to the search condition may be transmitted to the analyzing means 500 or the storage means 600 via the network 100 or may be transmitted directly to the analyzing means 500 or the storage means 600 without passing through the network 100. The analyzing means 500 or the storage means 600 transmits analysis result data or storage data corresponding to metadata of the search condition to the consumption unit (one of the consumption units 514, 534, 624, and 644). The consumption unit (one of the consumption units 514, 534, 624, and 644) receives analysis result data, and configures a user interface corresponding to analysis result data from among various user interface models and transmits the user interface to the user terminal 700. 960 is a view illustrating a user interface of a search result provided to the user terminal 700, and illustrates a motion detection/tracking result about the white car with respect to the search period set by a user.

According to the structure of the data processing system 10 as described above, based on the assumption that generation, analysis, storage, and consumption of data are performed at various locations, various user interfaces may be provided to a user by analyzing and processing data collected via various routes, in a parallel and distributed manner.

The inventive concept can be written as computer programs and be implemented in general-use digital computers that execute the computer programs using a computer readable recording medium. Examples of the computer readable recording medium include all kinds of recording devices in which computer readable data is stored.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the inventive concept can be easily construed by programmers of ordinary skill in the art to which the inventive concept pertains.

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

INDUSTRIAL APPLICABILITY

The inventive concept provides a data processing system for providing a user with various user interfaces by analyzing and processing data collected via various routes, in a parallel and distributed manner.

The invention claimed is:

1. A data processing system comprising:
a data generator comprising at least one network camera, at least one sensor, and an external data source, the data generator being configured to collect first data obtained by analyzing image data and audio data obtained using the at least one network camera, using first metadata from among predefined metadata, collect second data obtained by the at least one sensor, and collect third data provided from the external data source;
a plurality of data analyzers comprising a first processor, a first storage, and a first user interface, the plurality of data analyzers being configured to store first analysis result data obtained by analyzing the first through third data received via a network, using second metadata from among the predefined metadata;
a plurality of data storage units comprising a second processor, a second storage, and a second user interface, the plurality of data storage units being configured to store the first through third data and the first analysis result data via the network and store second analysis result data obtained by analyzing the first through third data and the first analysis result data by using third metadata from among the predefined metadata,
wherein each of the first user interface and the second user interface provides, according to a request from a user terminal, at least one of the first data, the second data, the third data, the first analysis result, and the second analysis result data, wherein the second storage is configured to store the first through third data and the first analysis result data,
wherein the second processor is configured to generate the second analysis result data obtained by analyzing the first through third data and the first analysis result data by using the third metadata from among the predefined metadata,
wherein the second processor is configured to provide, according to the request from the user terminal, the second analysis result data,
wherein the second processor comprises:
a distributor configured to distribute the first through third data; and
at least one of a simultaneous analyzer and a sequential analyzer,
wherein the simultaneous analyzer comprises a first plurality of analysis modules, wherein each of the first plurality of analysis modules receives the first through third data distributed by the distribution module and performs analysis by using the third metadata, and
wherein the sequential analyzer comprises a second plurality of analysis modules performing analysis in series on the first through third data distributed by the distribution module using the third metadata.

2. The data processing system of claim 1, wherein the at least one network camera comprises:
a generator configured to generate the image data and the audio data; and
a third processor configured to generate the first data based on third analysis result data obtained by analyzing the image data and the audio data by using the first metadata from among the predefined metadata.

3. The data processing system of claim 1, wherein the plurality of data analyzers comprise a data analyzer comprising:
the first processor configured to generate the first analysis result data obtained by analyzing the first through third data by using the second metadata from among the predefined metadata; and
the first user interface configured to provide, according to the request from the user terminal, the first analysis result data.

4. The data processing system of claim 1, wherein the plurality of data analyzers comprise a data analyzer comprising:
the first processor configured to generate the first analysis result data obtained by analyzing the first through third data by using the second metadata from among the predefined metadata; and the first storage configured to store the first analysis result data.

5. The data processing system of claim 1, wherein the plurality of data analyzers comprise a data analyzer comprising:
the first processor configured to generate the first analysis result data obtained by analyzing the first through third data by using the second metadata from among the predefined metadata;
the first storage configured to store the first analysis result data; and
the first user interface configured to provide, according to the request from the user terminal, the first analysis result data stored in the storage.

6. The data processing system of claim 1, wherein the first processor is configured to generate the first analysis result data obtained by analyzing the first through third data by using the second metadata from among the predefined metadata, wherein the first storage is configured to store the first analysis result data, and
wherein the first interface is configured to provide, according to the request from the user terminal, the first analysis result data stored in the first storage.

7. The data processing system of claim 1, wherein the plurality of data storage units comprise a data storage unit comprising the second storage stores the first through third data and the first analysis result data.

8. The data processing system of claim 1, wherein the plurality of data storage units comprise a data storage unit comprising:
the second storage configured to store the first through third data and the first analysis result data; and
the second user interface configured to provide the first through third data and the first analysis result data according to the request from the user terminal.

9. The data processing system of claim 1, wherein the plurality of data storage units comprise a data storage unit comprising:
the second storage configured to store the first through third data and the first analysis result data; and
the second processor configured to generate the second analysis result data obtained by analyzing the first through third data and the first analysis result by using the third metadata from among the predefined metadata.

10. The data processing system of claim 1, wherein the plurality of data storage units comprise a data storage unit comprising:
the second storage configured to store the first through third data and the first analysis result data;
the second processor configured to generate the second analysis result data obtained by analyzing the first through third data and the first analysis result data by using the third metadata from among the predefined metadata; and the second user interface configured to provide, according to the request from the user terminal, the second analysis result data.

11. The data processing system of claim 6, wherein the first processor comprises:

a distributor configured to distribute data; and at least one of a simultaneous analyzer and a sequential analyzer, wherein the simultaneous analyzer comprises a plurality of different analysis modules from one another, wherein each of the analysis modules receives the data distributed by the distribution module and performs analysis by using metadata predefined in each of the distribution modules, and wherein the sequential analyzer comprises a plurality of different analysis modules from one another, wherein an analysis module that has received data distributed by the distribution module performs analysis by using predefined metadata, and a next analysis module receives a result of the analysis and performs analysis by using predefined metadata and outputs a result of the analysis to another next analysis module.

12. The data processing system of claim 11, wherein the distributor periodically communicates with the analysis module to detect a state of the analysis module, and backs up data to be distributed when the analysis module operates abnormally.

13. The data processing system of claim 1, wherein the distributor periodically communicates with the analysis module to detect a state of the analysis module, and backs up data to be distributed when the analysis module operates abnormally.

14. The data processing system of claim 1, wherein the plurality of storage units are further configured to process stored data and analysis result by structuralizing and arranging the data and the analysis result so that the data and the analysis result are easy to search.

15. The data processing system of claim 1, wherein the first user interface and the second user interface are based on a plurality of user interface models, and are based on at least one of the first through third data, the first analysis result, and the second analysis result.

16. The data processing system of claim 1, wherein the user terminal downloads an application via which the data processing system is accessible.

17. The data processing system of claim 16, wherein the user terminal sets a search condition including predetermined time information to receive the user interface from the consumption means.

18. The data processing system of claim 17, wherein the search condition is transmitted to the plurality of data analyzers or the plurality of storage units via the network, or is directly transmitted to the plurality of data analyzers or the plurality of storage units.

* * * * *